Dec. 26, 1967 A. M. MASTERS 3,359,669

FILM VIEWING DEVICE

Filed June 22, 1965 5 Sheets-Sheet 1

INVENTOR.
Albert M. Masters
BY
Lynnestvedt & Lechner
ATTORNEYS

Dec. 26, 1967 A. M. MASTERS 3,359,669

FILM VIEWING DEVICE

Filed June 22, 1965 5 Sheets-Sheet 3

INVENTOR.
Albert M. Masters
BY
Lynnestvedt & Lechner
ATTORNEYS

Dec. 26, 1967  A. M. MASTERS  3,359,669
FILM VIEWING DEVICE

Filed June 22, 1965  5 Sheets-Sheet 4

INVENTOR.
Albert M. Masters
BY
Synnestvedt & Lechner.
ATTORNEYS

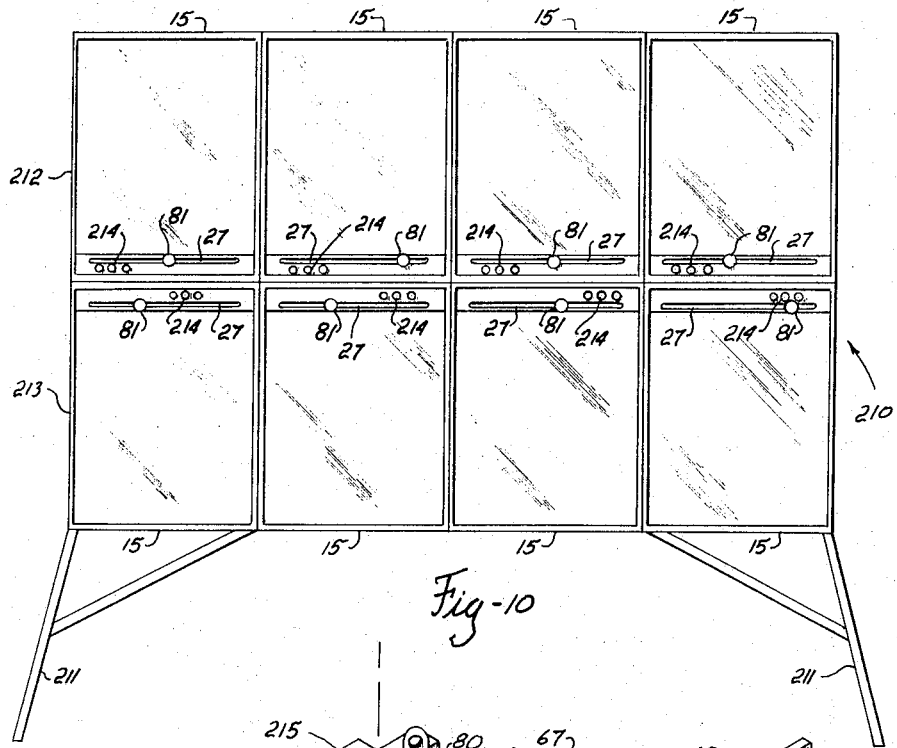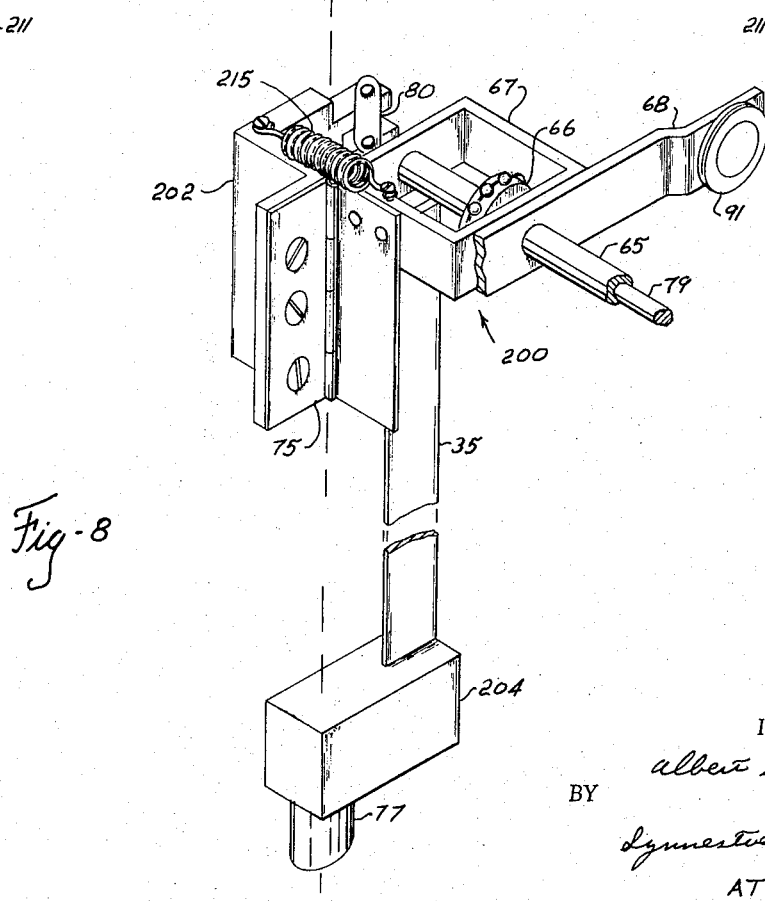

United States Patent Office 3,359,669
Patented Dec. 26, 1967

3,359,669
FILM VIEWING DEVICE
Albert M. Masters, 412 Robinson Ave.,
Pen Argyl, Pa. 18072
Filed June 22, 1965, Ser. No. 466,009
15 Claims. (Cl. 40—106.1)

This invention relates to film viewing devices of the kind commonly used for the study of medical X-rays and other types of X-ray photographs. While the invention will be described with particular reference to apparatus specially suited for use with X-rays, it should be understood that various features of the invention are useful with other kinds of film viewers.

X-ray films have proved to be a useful diagnostic tool for the medical profession. The common X-ray picture is a sheet of transparent film having on it a photographic emulsion. Most of the emulsion is converted to a black color by the action of the X-rays. The anatomical features of interest in the photograph generally appear as shadows of varying degrees of gray against the black background of the film. Physicians and others making use of X-ray photographs study them by passing light through them to create a visually discernible contrast between the black areas on the film and the various gray areas.

Devices have been developed to facilitate the study of X-ray films by providing a source of light to pass through the film and a holder for the film. One common form of such device is a cabinet, generally rectangular in shape, with a translucent face on which X-ray films can be mounted, and internally disposed lighting means such as fluorescent tubes or incandescent bulbs. In general, fluorescent lighting is preferred for such cabinets, since fluorescent tubes run cooler than do incandescent bulbs and the danger of damage to the film being viewed by heat from the light source is thus lower. It is sometimes found convenient to provide the cabinet with cooling means such as a blower, to provide an added measure of protection for the X-ray film.

Sometimes the objects of interest to the person studying the X-ray film are represented on the film by ephemeral shadows or very subtle gradations of gray shades. Such gradations of gray are not adequately brought out by the general use viewing cabinet just described. In order to study the shadings it is necessary to pass very strong light through the section of the film which is of interest. This is commonly done by the use of an auxiliary spot light separate from the viewing cabinet described above, and the film is held over the face of the spot light by hand.

Some times a spot light is incorporated in the viewing cabinet. When this is done, the film is first studied under general illumination from the viewing cabinet and when the area of special interest is located, the general illumination is turned off and the film is moved by hand so that the area of interest is centered over the spot light.

This invention provides an improved film viewing cabinet for X-rays having means for providing general illumination and an internally mounted spot light for the study of portions of a film under high intensity light. The spot light is mounted within the film viewing cabinet so that, by manipulation of externally provided controls, the spot of light can be cast on substantially any part of an X-ray film mounted or held on the face of the cabinet. Thus, the person studying the film no longer need remove it from the cabinet after his study under general illumination to orient it with respect to a fixed spot light for study under high intensity illumination. This simplification is a considerable convenience and is quite important in a number of situations. In the nature of medical work it is often necessary to study X-ray films quite promptly after the picture has been taken and developed.

Thus, the film often receives its first study while still wet. Wet films are awkward to handle and are easily damaged. Thus, elimination of the need for extra handling of the film is advantageous. Furthermore, in the study of certain types of X-ray films, it is desirable to make measurements on the film to determine the precise location of anatomical parts with respect to each other. Such measurements are conveniently made with auxiliary equipment placed or mounted on the face of the X-ray viewing cabinet. The making of such measurements is much easier if the film does not have to be repeatedly moved to and from the viewing cabinet in the course of study under high illumination.

From the foregoing, it can be seen that an important obejct of the present invention is the provision of a film viewing cabinet providing both general illumination for overall study of X-ray films and the like, and internally mounted, movable, high intensity spot illumination for detailed study of such films.

The use of a movable high intensity spot light within a film viewing cabinet presents a number of problems which have been overcome by the present invention. One problem is that the spot light and its attendant equipment are desirably mounted in the cabinet just behind the viewing face. When so mounted, these items tend to cause shadows when the general illumination lights in the cabinet are used.

In accordance with one object of the present invention, the high intensity lighting equipment is arranged so that it can be moved out of the way within the cabinet when it is not in use, and thus will cause no shadows.

Another problem involved in a film viewing cabinet having a movable internally mounted spot light is that the spot light cannot be directly manipulated since it is inside the cabinet. Thus, in accordance with another feature of the present invention, control and manipulating devices are provided so that the internal spot light can be moved and controlled by one standing in front of the cabinet, or if desired, from a remote control station.

In order to provide in an internally mounted spot light the high light intensity which is required, it has been found necessary to use incandescent bulbs such as those used in slide and movie projectors. Such bulbs generate considerable heat, and the heat creates a substantial danger of damage to the films mounted on the cabinet for study unless it is adequately dissipated. In accordance with this invention, special equipment is provided for dissipating the heat generated in the cabinet by the spot light and for providing protection for the film.

Those who study X-ray films prefer to be able to select the size of high intensity spot cast on the film. The internally mounted spot light provided by this invention includes equipment for selectivity varying the size and intensity of the light spot for doing so by a controlling device operable from the exterior of the cabinet.

The above objects and purposes, together with others, can be more fully understood after a consideration of the detailed description which follows together with the accompanying drawing in which:

FIGURE 1 is a front elevational view of a film viewing cabinet constructed in accordance with the invention, with some parts broken away;

FIGURE 2 as a sectional elevational view of the cabinet shown in FIGURE 1, the view being taken on line 2—2 of FIGURE 1;

FIGURE 8 is a perspective view, with some parts broken away, of the upper and lower mounting means for the spot illuminator mounting track;

FIGURE 10 is another embodiment of the invention in which a series of film viewing cabinets are assembled together so that a plurality of X-ray films may be studied and compared at one time.

FIGURES 1 and 3 show that the film viewing device includes a cabinet 15 which is generally rectangular in front elevation, and which is more or less prismatic in over-all shape. The sides, back, top and bottom of the cabinet are desirably formed of sheet metal of suitable gauge.

Figure 1:
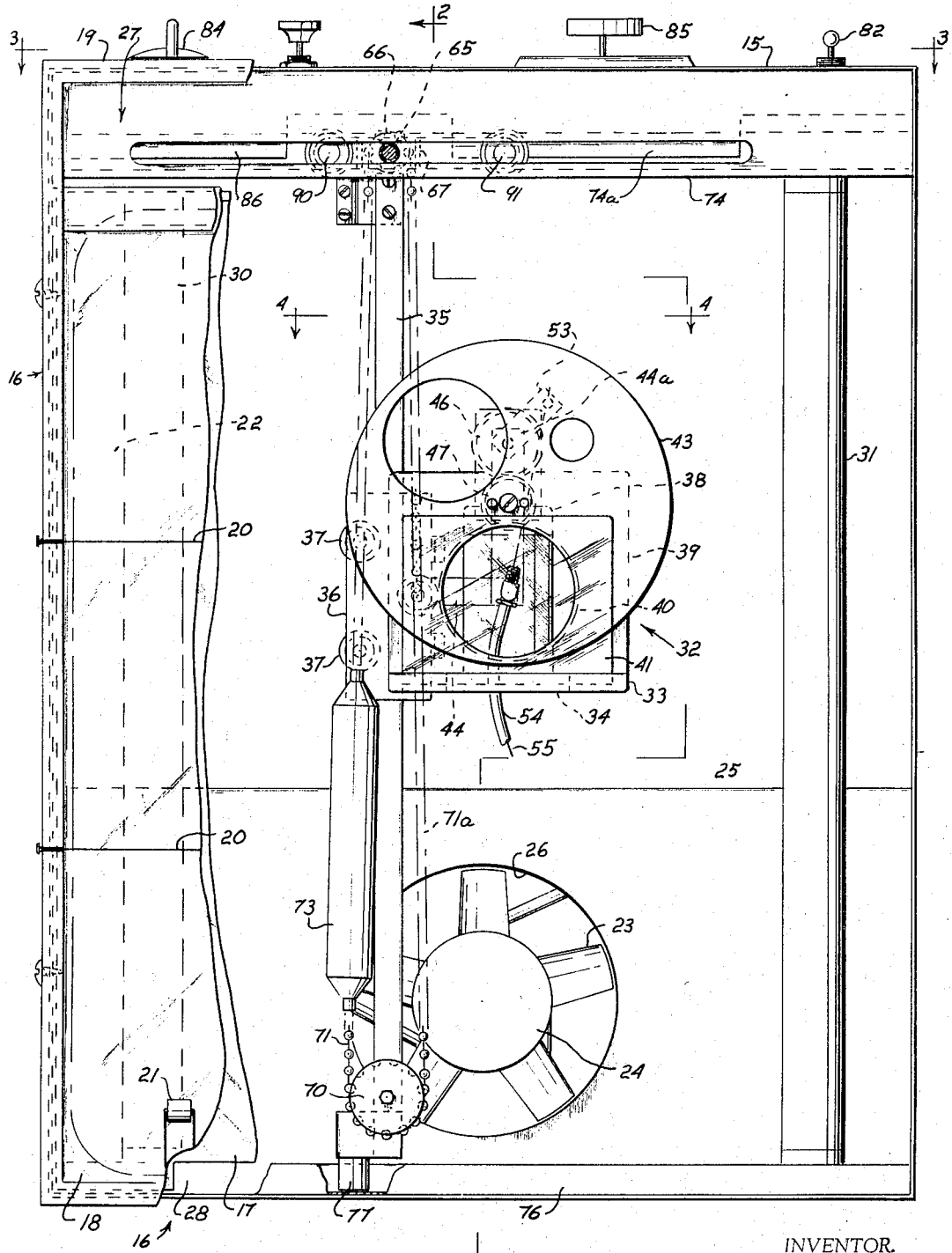
Figure 2:
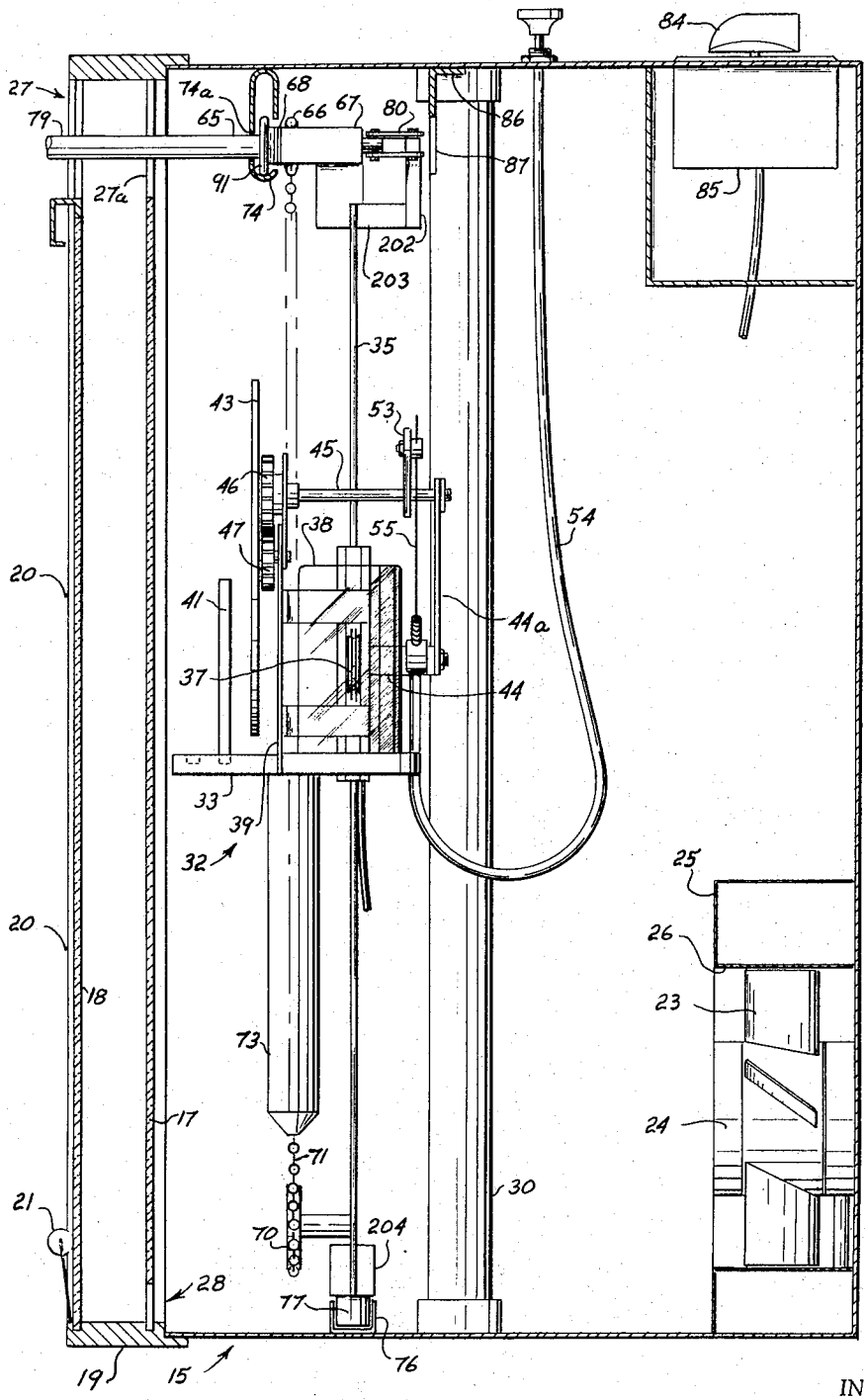
Figure 3:
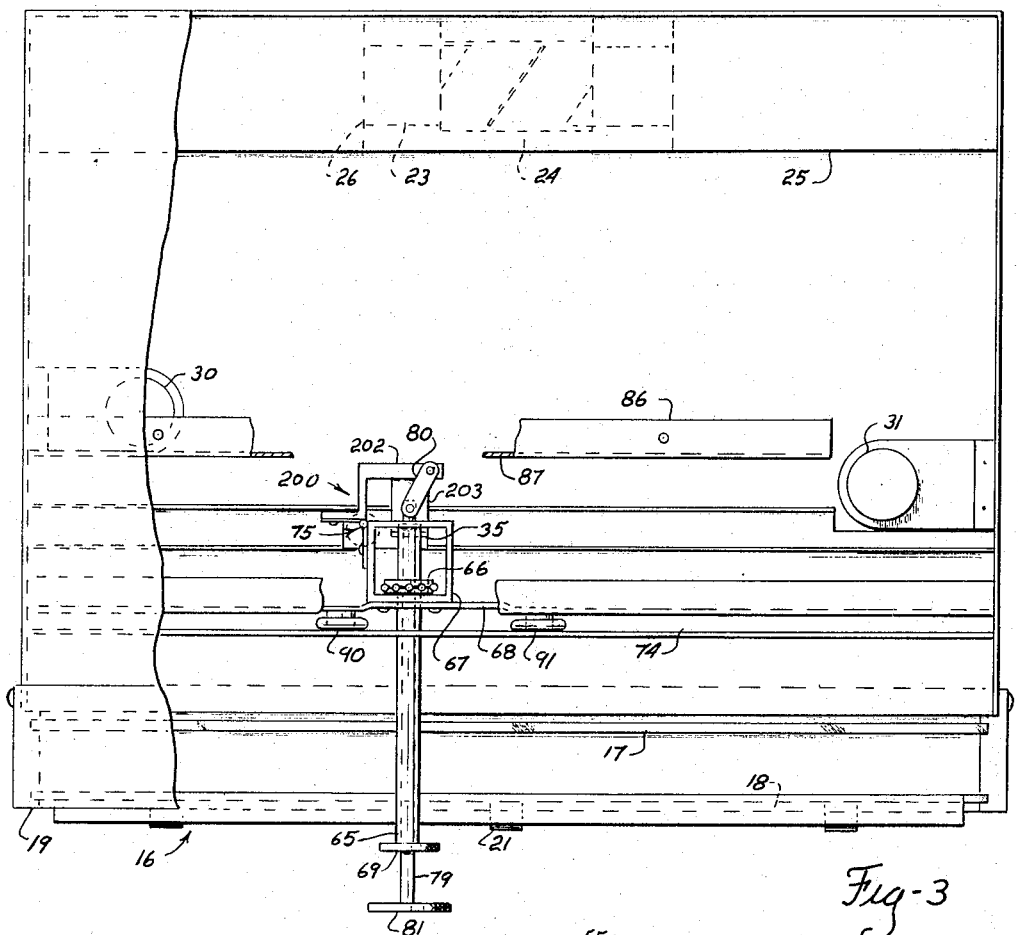
FIGURE 3 is a plan view of the cabinet of FIGURE 1, the view being taken on the line 3—3 of FIGURE 1, with some parts broken away and with other parts omitted in order to simplify the presentation.

The face of the cabinet is adapted to receive and hold the X-ray film to be studied. The face is desirably translucent so that the light passing through the film will be evenly distributed and free from glare. In FIGURES 1 and 3, the face of the cabinet is designated generally as 16. It is made up of an inner translucent panel 17 and an outer panel 18 which may be clear. The panels 17 and 18 may be of plastic or glass and are mounted in a frame 19 which holds them generally parallel to each other but a selected distance apart. The space between the two panels 17 and 18 comprises a channel through which a stream of cooling air is directed as will be explained below.

The face of the cabinet is equipped with suitable devices for holding an X-ray film on it. These devices include wires 20 and clips 21. An X-ray film 22 is shown in phantom outline in viewing position on the face of the cabinet.

As mentioned earlier, the X-ray films are made of plastic material which distorts or melts if it is allowed to get too hot. The general illumination equipment within the cabinet usually utilizes fluorescent bulbs which generate relatively little heat. However, the spot illuminating equipment in the cabinet house employs an incandescent bulb which does generate an appreciable amount of heat while it is in use. In order to dissipate such heat, and thus protect the film, an air circulating system is provided. One component of the system is fan 23 driven by motor 24. At the bottom rear portion of the cabinet there is mounted a sheet metal housing 25 which covers some of the electrical equipment associated with the illuminating apparatus. A cylindrical passage 26 is formed in the back wall of the cabinet and in the housing 25 to provide an air passage. The fan 23 and its motor 24 are mounted in the cylindrical passage 26. The fan is operated to blow air from the outside into the interior of the cabinet, but may be operated in the opposite direction to exhaust air from the interior of the cabinet.

When the fan is arranged to blow cooling air into the cabinet, the air leaves the cabinet through slot 27 on the cabinet face near the top. In moving from the fan 23 to slot 27, the air follows one of two principal paths. One path is from the fan past the incandescent bulb in the interior of the cabinet, through slot 27a in inner panel 17, and out the slot 27. This stream of air cools the bulb directly and the heat transferred from the bulb to the cooling air is quickly forced out of the cabinet through slot 27.

The other principal air stream through the cabinet forms a protective curtain of moving cool air between the incandescent bulb and the film on the face of the cabinet. Thus, some of the air from fan 23 passes through slot 28 at the bottom of translucent panel 17. It then flows upwardly in the space between translucent panel 17 and panel 18 and ultimately out through slot 27 at the top of the cabinet.

When the fan is operated to exhaust air from the cabinet, the cooling air moves through the cabinet to the fan in the same two principal paths, but it moves along these paths in the opposite direction. In this arrangement, the cooling air enters the unit through slot 27. One stream moves through slot 27a into the interior of the cabinet, past the bulb and out through the fan opening. The other stream moves downwardly in the space between translucent panel 17 and panel 18. It then flows through slot 28 at the bottom of translucent panel 17 into the interior of the cabinet and ultimately out through the fan opening.

General illumination for the film being studied is provided by light sources positioned within the cabinet 15. It is preferred that these light sources be of the fluorescent type, since fluorescent tubes generate less heat per unit of light than do other types. As can be seen in FIGURES 1 and 3, one straight fluorescent tube 30 is mounted near the left margin of the cabinet (as viewed in FIGURES 1 and 3) and another such tube 31 may be mounted near the right hand margin. Straight tubes are preferred, but other shapes such as circular may be used. As is shown to best advantage in FIGURE 3, the general illuminating equipment is mounted in the cabinet an appreciable distance back from the face 16 upon which the film is placed. Several advantages are obtained by this arrangement. In the first place, the distribution of light from the tubes 30 and 31 on the translucent face 15 tends to be more uniform than it would be if the lights were immediately adjacent the face.

Another advantage is that the space between the general illuminating means and the translucent face provides a very suitable location for the spot light employed in the invention and for the mounting and moving means for the spot light. It should be understood however, that the spot light and its mounting means can be positioned in other locations behind the translucent face. In the unit shown in the drawings, the internal spot light is mounted in the space lying in front of the general illuminating means and behind the translucent face. The mounting means for the spot light are so arranged that the light can be positioned at various locations in relation to the face without encountering interference from the fluorescent tubes. Thus the entire surface of the film being studied can be subjected to high intensity light from the spot light.

From FIGURE 3 it can be seen that the fluorescent tube 31 is mounted closer to the face of the cabinet than is fluorescent tube 30. The slightly staggered mounting of the fluorescent tubes tends to provide somewhat more uniform general illumination and tends to minimize the casting of shadows by the movable spot light and its mounting means. (Special means to be discussed below are also desirably included to eliminate shadows from the spot light.)

Figures 4, 5:
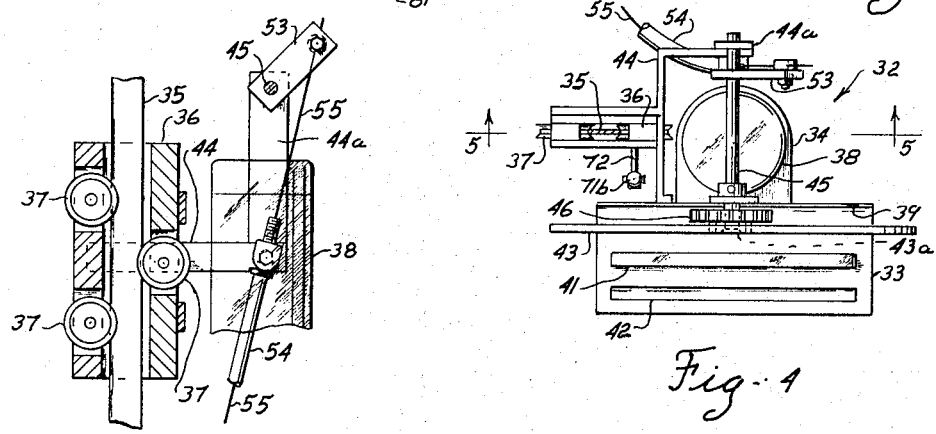
FIGURE 4 is a fragmentary plan view showing the spot illuminator equipment for the cabinet of FIGURE 1, the view being taken on the line 4—4 of FIGURE 1.
FIGURE 5 is a fragmentary elevational view taken on the line 5—5 of FIGURE 4.

The spot illuminating means for the film viewing cabinet is shown to best advantage in FIGURES 1, 4 and 5. In FIGURES 1 and 4, the spot illuminating means is designated generally as 32. It includes a base 33 having lamp socket 34 mounted thereon. The base of the spot illuminating means is slideably mounted on support or track 35 by means of bracket 36 which carries guide wheels 37.

An incandescent bulb 38 capable of producing high intensity light is mounted in socket 34. A 300-watt projector type bulb has been found quite suitable, although other bulbs may be used if desired. If a bulb of higher wattage is used, in order to obtain a spot of higher intensity, the cooling system should be commensurately increased in capacity so that the additional heat generated within the cabinet can be dissipated.

Mounted on base 33 is a light shield 39 which is positioned between the light bulb 38 and the translucent face 16 of the cabinet. The light shield 39 has a hole 40 in it in position to admit light from bulb 38 to face 16. The hole 40 is slightly larger than any of the holes in the spot sizing disk to be discussed below, so it is the holes in the sizing disk and not hole 40 in the light shield 39 which determine the size of the spot cast upon the face 16.

Also mounted on base 33 between light bulb 38 and the face of the cabinet is a heat shield 41 which may be conveniently made of Pyrex-type, heat-resistant glass. Base 33 is provided with an additional slot 42 to accommodate a second heat shield if it proves desirable to use one.

A spot sizing disk 43 is mounted for rotation on axle 43a journalled on light shield 39. Attached to the mounting bracket 36 of the spot illuminator is an auxiliary bracket 44 which, as can be seen in FIGURES 1, 4 and 5, extends to a position behind light bulb 38. An extension bracket 44a projects above bulb 38. A sizing disk drive shaft 45 is journalled through the extremity of bracket 44 and through the upper portion of light shield 39, as can be seen in FIGURE 4. The drive shaft 45 thus passes across the top of light bulb 38. A drive gear 46 is mounted on the front end of shaft 45. It meshes with a driven gear 47 on the axle of disk 43. In the embodiment of FIGURES 1 to 7, the drive shaft 45 is rotated by means of crank 53 at the back end of the shaft. The crank 53 is driven by means of a choke cable assembly 54 as is shown to best advantage in FIGURES 1, 4 and 5. The wire 55 of the choke cable assembly can be easily moved by means of a choke handle located on the exterior of the cabinet 15. In this way, provision is made for changing the size of the spot of light cast by the bulb 38, without interfering with the freedom of movement of the spot illuminating means to various locations in the cabinet. The flexibility of the choke cable assembly 54 contributes to this advantage. The relative sizes of gears 46 and 47 can be selected so that movement of the crank 53 through a convenient angle will result in rotation of the spot sizing disk through approximately one revolution and all three of the spot sizing holes of the disk can be brought into operative position thereby.

It should be understood that the drive shaft 45 for the spot sizing disk 43 can be rotated by other means than the crank and choke cable system shown in the drawings. Another drive system which provides control of the spot size from the exterior of the cabinet is one in which drive shaft 45 is connected, for example by a bevel gear, to a flexible shaft. The flexible shaft, like the choke cable, terminates on the exterior of the cabinet where it may be conveniently equipped with a knob. By rotating the knob, one rotates the flexible shaft, which in turn rotates drive shaft 45 and the spot sizing disk.

Another suitable drive system for the spot sizing disk makes use of a small electric motor mounted on the spot illuminator to engage and rotate shaft 45. The flexible wires by which the motor is energized may be connected to a control switch on the exterior of the cabinet. All of the arrangements described here meet the objective of providing for change of the spot size without interfering with the freedom of the movement of the spot illuminator within the cabinet.

As shown in FIGURE 1, a track 35 is enclosed within the cabinet and extends generally from the top to the bottom of the cabinet. Track 35 can conveniently be in the form of a straight flat bar. Spot illuminator 32 is slideably mounted on the track 35 by means of bracket 36 and the before-mentioned guide wheels 37. Thus the spot illuminator 32 can move in a rectilinear path up and down mounting track 35. This freedom of movement permits one to vertically position the spot illuminator with relation to an area of interest on an X-ray film regardless of whether the area is near the top of the film, near the middle, or at the bottom.

In normal operation, the spot illuminator is enclosed within cabinet 15, and is thus inaccessible to a person standing in front of the cabinet studying a film. It is therefore desirable to provide control mechanisms whereby the viewer can adjust the vertical position of the spot illuminator without disturbing the film. The control mechanisms provided to meet this need appear most clearly in FIGURES 1, 2, 3, and 4. A bracket 67 is connected to the top of track 35. As is shown to best advantage in FIGURE 3, a shaft 65 is journaled on bracket 67 and projects through slot 27 at the top of the front face of the cabinet. Shaft 65 is provided with a knob 69 at its outer end so that a person standing in front of the cabinet can conveniently rotate shaft 65 and thereby impart rotational movement to a pulley wheel 66 that is secured to the shaft.

In the vicinity of the bottom of track 35 is mounted a second pulley wheel 70. Chain 71 (which is shown partially in full lines and partially in phantom outline) is looped around pulley wheels 66 and 70. The pulley wheels 66 and 70 are sprocketed to positively engage chain 71 to provide a positive drive for the chain in both directions. The spot illuminator 32 is connected to chain 71 by arm 72 (see FIGURE 4). As can be seen in FIGURE 1, the spot illuminator is connected through arm 72 to chain 71 on the right hand run 71a of the chain. The ends of chain 71 are connected to a counterweight 73 to close the loop. The counterweight 73 is located in the left hand run of the chain loop and is of such weight that the spot illuminator will tend to stay in any vertical position at which it is placed until a displacing force is applied through knob 69.

The spot illuminator can be moved to any desired vertical position by manipulation of knob 69. Turning of the knob turns pulley wheel 66 and moves the chain 71. Clockwise rotation of pulley wheel 66 as viewed in FIGURE 1 will move the spot illuminator down and the counterweight up. Counterclockwise rotation of pulley wheel 66 by means of knob 69 will move the spot illuminator up.

If the spot illuminator 32 is to have the desired capability of casting a spot of high intensity light on substantially any portion of the film mounted on the face of the cabinet, it is necessary that it have horizontal mobility as well as vertical mobility. In order to provide the desired horizontal mobility, the support or track 35 for the spot illuminator is itself mounted for horizontal movement within the cabinet. A guide track 74 is mounted horizontally in the upper portion of cabinet 15 in the space between the general illuminating means 30 and 31 and the face of the cabinet 16.

A carriage assembly 200 is mounted on guide track 74 to move back and forth thereon. The carriage assembly body 68 has wheels 90 and 91 which run in the track. A bracket 67 is mounted on the carriage assembly and is cantilevered toward the rear of the cabinet. As appears most clearly in FIGURES 2 and 8, the bracket 67 carries a hinge 75. The portion of hinge 75 which is movable with respect to bracket 67 is provided with a Z-shaped bracket 202. A block 203 is mounted on the Z-shaped bracket on the leg of the Z opposite that connected to the hinge, and the track 35 is in turn connected to the block 203. The function of this mode of mounting of track 35 on the carriage assembly will be discussed more fully below. However, it can be pointed out here that the mounting system described provides horizontal mobility for the upper end of track 35.

Another horizontal guide track 76 is provided at the bottom of the cabinet. This track may conveniently be in the form of an upwardly open U-shaped channel. The lower guide track 76 is mounted substantially parallel to the upper guide track 74. The mounting of vertical track 35 in the lower horizontal guide track 76 is achieved by means of a block 204 connected to the bottom of track 35 and offset cylindrical pin 77 connected to the bottom of the block. The pin 77 is so positioned that it fits in the U-shaped guide track 76 as can best be seen in FIGURE 8. The axis of pin 77 is aligned with the pivotal axis of hinge 75. The mounting of the vertical track 35 and the lower guide track in the manner just described provides for horizontal mobility of the bottom portion of track 35. From the foregoing, it can be seen that track 35, and the spot illuminator 32, are so mounted on the cabinet that they have freedom to move in a generally horizontal rectilinear path back and forth behind the face of the cabinet. The spot illuminator can be moved to various horizontal positions within the cabinet by one stationed in front of the cabinet quite readily. Such movement can be easily effected by side to side movement of the shaft 65 which projects through slot 74a on the front of track 74 and slot 27 of the cabinet, shaft 65 being journalled on the carriage assembly 200.

Figure 6:
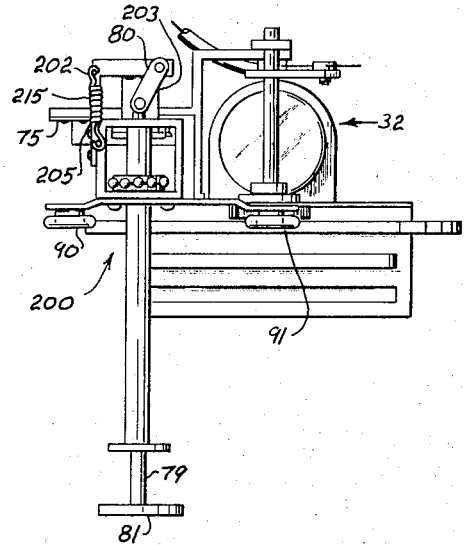
FIGURE 6 is a fragmentary plan view of a portion of the equipment of FIGURE 1, including the upper mounting means for the mounting track of the spot illuminator and the spot illuminator itself.
Figure 7:
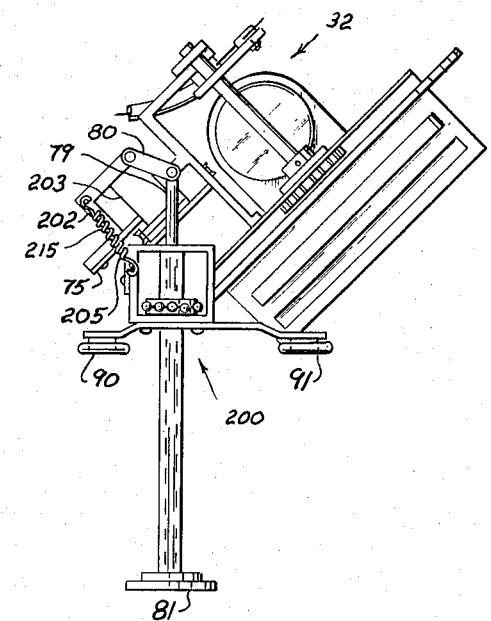
FIGURE 7 is a fragmentary plan view similar to FIGURE 6 but showing the spot illuminator in retracted position.

The spot illuminator, and to a certain extent the support or track 35 both tend to cast shadows on the translucent face of the cabinet when the spot light is not in use and the fluorescent lights 30 and 31 are in use to provide general illumination. Such shadows are undesirable because they make it more difficult to distinguish and evaluate the gradations of gray normally occurring on an X-ray film. For this reason, in accordance with the invention, the mounting means for the spot illuminator 32 is arranged so that it can be pivoted more or less out of the space between the general illuminating means and the translucent face. There can be seen in FIGURES 3, 6 and 7, when the spot illuminator is so retracted into the interior of the cabinet, it is substantially out of the path of light issuing from the fluorescent tubes 30 and 31 and directed toward the translucent face. As mentioned above, track 35 is connected to bracket 67 through block 203, Z-shaped bracket 202 and hinge 75. From FIGURES 3 and 8 is can be seen that shaft 65 is hollow and that a rod 79 is passed through the center of the hollow shaft. The inner end of rod 79 is pivotally connected to the leg of Z-shaped bracket 202 which carries block 203 by means of links 80. As can be seen by a comparison of FIGURES 6 and 7, as the rod 79 is pushed inwardly, it pushes through links 80 to rotate Z-shaped bracket 202 about the pivot point 205 of hinge 75. The direction of rotation as viewed in FIGURES 6 and 7 is counterclockwise. Since spot illuminator 32 is carried on track 35 which is connected to Z-shaped bracket 202, it too rotates in a counterclockwise direction about the pivot pin 205 of hinge 75. Thus the spot illuminator is swung back into the interior of the cabinet when knob 81 is pushed. It moves generally into the space between the two fluorescent tubes and generally out of the space between the fluorescent tubes and the face of the cabinet. To bring the spot illuminator back into position to cast a spot of light on the cabinet face, one applies a pulling force to knob 81. This force, through rods 79 and links 80 rotates Z-shaped bracket 202 and the spot illuminator 32 back into a position generally parallel to and immediately behind the face. A biasing spring 215 is connected between Z-shaped bracket 202 and bracket 67 to urge the spot illuminator toward the limits of its pivoting motion, i.e., the positions shown in FIGURES 6 and 7, when the spot illuminator is at an intermediate pivoting position.

If the spot illuminator is positioned too close to the side margins of the cabinet, there is some danger that it will hit one of the fluorescent light tubes when it is swung to its retracted position. In order to eliminate this possibility, an angle bar 86 is connected to the top of the cabinet just behind the upper guide track 74. As can best be seen in FIGURES 2 and 3, the depending leg 87 of the bar 86 is in position to block the swinging of brackets 203. A notch 88 is cut in the depending leg 87 so that the bracket 202 can be swung back if the carriage 68 is centrally positioned on guide track 74. In summary, the angle bar 86 blocks the retraction of spot illuminator 32 except when the illuminator and its mounting means are centrally positioned in what may be termed a "safe zone."

Inasmuch as pin 77 is cylindrical in shape, the rotation of spot illuminator 32 and track 35 just described does not disturb the slideable mounting of the track in lower guide track 76. It should be noted that top pulley wheel 66 is not mounted on hinge 75 and thus does not pivot with the hinge. Bottom pulley wheel 70, however, is mounted on track 35 and is rotated upon rotation of the track; as a consequence of this construction, the chain loop is twisted somewhat when the spot illuminator is rotated to its retracted position. However, the chain loop has enough inherent flexibility to accommodate itself to the twisting action just described.

When the person using the cabinet desires to move the spot illuminator back into operative position from the retracted position, he applies a pulling force on knob 81. The pulling force is transmitted through rod 79 and link 80 to rotate hinge 75 clockwise and to swing the spot illuminator back into the space immediately behind the translucent face where it is oriented to cast a spot of light on the translucent face.

Figure 9:
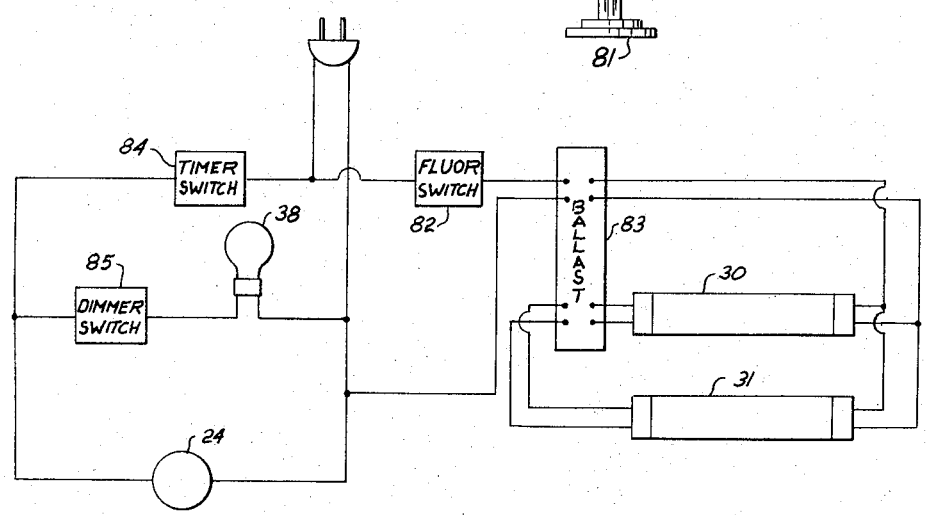
FIGURE 9 is a simplified wiring diagram for the unit of FIGURE 1.

FIGURE 9 shows in somewhat simplified form the electrical equipment utilized in the film viewing cabinet and the wiring diagram therefor. From FIGURE 9 it can be seen that fluorescent tubes 30 and 31 are controlled by switch 82 and are serviced by ballast 83. FIGURE 9 also shows that the spot light 38 and the fan motor 24 are wired in parallel. A timer 84 is wired in series with both the spot light and the fan motor. Thus, the spot light and fan can be operated only when the timer is set at a time other than zero. Dimmer 85 is wired in series with the spot light 38. The type of dimmer preferably used in one incorporating an on-off switch as well as a rheostat for adjusting the current flow through, and hence the brillance of, spot light 38. When such a dimmer is used, the spot light can be turned off as soon as it is no longer needed, but the fan will continue to run until timer 84 has timed out.

The unit shown in FIGURE 10, and designated generally as 210, is made up of a plurality of cabinets 15 of the kind which have been discussed in detail above. The group of cabinets may be provided with legs 211 for positioning them at a convenient height. The cabinets are arranged in vertical array two cabinets high. Thus the upper array in FIGURE 10 is designated 212 and the lower array 213. Each of the cabinets is equipped with an internally mounted spot illuminator of the kind shown in the FIGURES 1–7. The front of each of the cabinets has a slot 27 through which the control knob 81 for the internally mounted spot illuminator projects. Each of the cabinets 15 is also provided with control means 214 for the fan, the fluorescent lights, and the spot illuminator.

It should be noted that the control means of the upper array of cabinets are positioned at the lower margins of said cabinets, while the control means for the lower array of cabinets are positioned along the upper margins of those cabinets. This arrangement is of considerable advantage in a multi-cabinet unit, since it makes the unit readily adaptable to use with automatic film placing equipment for storing X-ray films and for positioning them on the faces of cabinets for study under illumination. Such automatic equipment for the upper array of cabinets can conveniently be placed above the unit 210 and similar equipment for the lower array can be placed below it. By placing the controls for the cabinets in the manner just described, that is more or less along the horizontal center line of the unit 210, they are out of the path of travel of X-ray films being fed by the storage and feeding equipment to the cabinet faces.

Some types of automatic film placing equipment for storing X-ray films and positioning them for study feed the films to an array of cabinets from the side. When such equipment is used, a multi-cabinet unit of the type shown in FIGURE 10, with the controls arranged along the center line, can be used. Another arrangement of a multi-cabinet unit quite suitable for use with this type of film placing equipment is much like that shown in FIGURE 10 but has the control means for the upper array or tier of cabinets along the upper margin, and the control means for the lower array along the lower margin.

Those skilled in the art of evaluating X-ray films will understand that there are various ways of utilizing the invention and of exploiting its advantages. A typical manner of using the film viewing cabinet just described is as follows: The film to be inspected is placed on the face 16 of the cabinet and is secured in place by means of wires 20 and clips 21. In order to give the film a general inspection, the person using the equipment throws switch 82 to turn on the fluorescent lights 30 and 31 which form the general illuminating means. If the spot illuminator is casting a shadow, the operator pushes on knob 81 to move the spot illuminator to its retracted position. The fluorescent lights 30 and 31 cast a general uniform light on the inside of translucent face 16, and a sufficient quantity of this light passes through the X-ray film so that the general shadows of the film can be distinguished and studied.

When the person studying the film has selected a given portion thereof for detailed study, based on his survey of the film under general illumination, he turns off fluorescent lights 30 and 31 by throwing switch 82. The operator moves the spot light from its retracted position to its operating position by pulling on knob 81. He then sets timer 84 at some convenient time interval such as ten minutes. By doing so, the operator has turned on the fan. He then turns on spot light 38 by throwing the switch of dimmer 85. He adjusts the setting of the dimmer 85 to provide a light of desired brilliance. He then selects the size of light spot he wants by manipulating the choke handle at the end of choke cable 54. He then moves the spot of high intensity light to the place on the film that he wishes to study by pushing on shaft 65 to change the horizontal position of the spot, and by rotating shaft 65 by means of knob 69 to change the vertical position of the spot.

When the operator has completed his study of the film under high intensity light, he turns off the spot light 38 by throwing the switch of dimmer 85. The timer 84 times out in due course, and fan motor 24 runs until the timer has run out. This mode of operation is desirable since the running of the fan after spot light 38 has been turned off will tend to cool the bulb and the interior of the cabinet.

I claim:

1. A film viewing device comprising a cabinet having a translucent face on which a film can be positioned for viewing, spot illuminating means mounted in said cabinet, said spot illuminating means being moveable within the cabinet to cast a spot of light on any area of a film positioned on said translucent face without shifting the position of the film and general illuminating means mounted in said cabinet a spaced distance behind said translucent face in position to cast light generally uniformly on said translucent face.

2. A film viewing device according to claim 1 including, mounting means for said spot illuminating means comprising a track on which said spot illuminating means is positioned, said track providing for freedom of movement of the spot illuminating means in a pre-selected rectilinear path generally parallel to said translucent face, said mounting means further comprising guide means on which said track is positioned, said guide means providing for freedom of movement of the track and spot illuminating means in a second preselected rectilinear path generally parallel to said translucent face and perpendicular to said first mentioned rectilinear path, and drive means for moving said spot illuminating means in each of said rectilinear paths.

3. A film viewing device according to claim 2 including control means for said mounting means located exteriorly of said cabinet in position for manipulation by one viewing a film positioned on said translucent face to effect positioning of the spot illuminating means to cast a spot of light on the desired area of said face.

4. A film viewing device according to claim 1 in which said spot illuminating means includes a light source which generates heat in addition to light, said translucent face comprising a pair of panels, both of which transmit light and at least one of which is translucent, said panels being mounted on the front of said cabinet generally parallel to each other a spaced distance apart, the innermost of said panels having a slot near the bottom thereof providing communication between the interior of the cabinet and the space between said panels, the innermost of said panels further having a slot near the top thereof further providing communication between the interior of the cabinet and the space between said panels, the outermost of said panels having a slot near the top edge thereof providing for air flow between the exterior of said cabinet and either of the slots in the innermost panel, said cabinet being provided with an opening in the back thereof near the bottom, blower means mounted in said cabinet opening for forcing air through said cabinet in two principal paths, one of which passes through the space between the two panels of said translucent face, and the other of which passes through the portion of said cabinet occupied by the heat generating light source of said spot illuminating means.

5. A film viewing device comprising a plurality of cabinets as specified in claim 1 each of said cabinets being provided with control means projecting from the face of said cabinet near a margin thereof for moving the spot illuminating means about within the cabinet, said cabinets being arranged in a vertical tier two cabinets high, each cabinet in each tier having its control means projecting at the same margin of the cabinet as the other cabinets in its tier.

6. A film viewing device according to claim 5 in which each cabinet in the lower tier has its control means projecting at the upper margin of the cabinet and each cabinet in the upper tier having its control means projecting at the lower margin of the cabinet.

7. A film viewing according to claim 1 wherein movement of the spot illuminating means within the cabinet can be directed and controlled by a viewer from the viewing position.

8. A film viewing device according to clam 1 in which a diaphragm for varying the light spot size is positioned between the light source and the translucent face.

9. A film viewing device according to claim 1 and further including means for varying the intensity of the spot illuminating means.

10. A film viewing device according to claim 1 wherein the spot illuminating means is mounted on moveable support means located in the cabinet space between the translucent face and the general illuminating means, said spot illuminating means being pivotally mounted on said support means for swinging movement between an illuminating position and a retracted position in the interior of said cabinet substantially out of the path of light from the general illuminating means to the translucent fact, and means for pivoting said spot illuminating means on said support means.

11. A film viewing device according to claim 10 wherein blocking means are provided to prevent pivoting of the spot illuminating means except when it is located at certain preselected positions within the cabinet.

12. A film viewing device according to claim 1 wherein the general illuminating means include a pair of straight fluorescent type light tubes mounted in the cabinet, one on each side thereof.

13. A film viewing device comprising a cabinet having a translucent face on which a film can be positioned for viewing, a pair of guide rails in said cabinet behind said translucent face, said guide rails being mounted adjacent opposite margins of said cabinet, generally parallel to each other and to the plane of said translucent face, a mounting track in said cabinet extending between said guide rails and being slideably connected thereto at its ends, spot illuminating means slideably mounted on said mounting track, a slot along a cabinet face margin adjacent to and aligned with one of said guide rails, and drive means extending through said slot and being connected to said mounting track for movement therewith, said drive means including means for moving said spot illuminating means along said mounting track.

14. A film viewing device comprising a cabinet having a translucent face on which a film can be positioned for viewing, spot illuminating means located in said cabinet for casting a spot of light on said translucent face, a support for said spot illuminating means, pivotal mounting means in said cabinet pivotally connecting said support to said cabinet and providing for movement of said support and said spot illuminating means between a first position in which said spot illuminating means is oriented to cast a spot of light on said translucent face and a second position in which said spot illuminating means is rotated away from said face, control means exteriorly mounted on said cabinet for pivoting said support and general illuminating means in said cabinet behind said support and adjacent a margin of said cabinet.

15. A film viewing device comprising a cabinet having a translucent face on which a film can be positioned for viewing, general illuminating means mounted in said cabinet a spaced distance behind said face in position to cast light generally uniformly on said translucent face, spot illuminating means located in said cabinet, a mounting assembly for said spot illuminating means including a bracket, a track, a carriage member and a carriage guide, said spot illuminating means being secured to the bracket, said bracket riding on the track, said track and bracket providing for freedom of movement of the spot illuminating means in a first pre-selected rectilinear path generally parallel to said translucent face, said track being secured to a carriage member, said carriage member riding on a carriage guide, said carriage and carriage guide providing for freedom of movement of the track and spot illuminating means in a second pre-selected rectilinear path generally parallel to said translucent face and generally perpendicular to said first rectilinear path, and drive means for independently moving said spot illuminating means in each of said rectilinear paths.

References Cited

UNITED STATES PATENTS

| | | | |
|---|---|---|---|
| 1,704,811 | 3/1929 | Stuber | 88—24 |
| 2,357,593 | 9/1944 | Leavell | 35—35 |
| 2,436,162 | 2/1948 | Cadenas | 40—106.1 |
| 2,501,840 | 3/1950 | Bradford | 40—86 |
| 2,516,270 | 7/1950 | Swain | 40—106.1 |
| 2,534,637 | 12/1950 | Sussin | 40—106.1 |
| 2,782,528 | 2/1957 | Wastl | 35—35.2 |
| 2,957,389 | 10/1960 | Moore | 88—24 |

EUGENE R. CAPOZIO, *Primary Examiner.*

W. J. CONTRERAS, *Assistant Examiner.*